Figure 1:
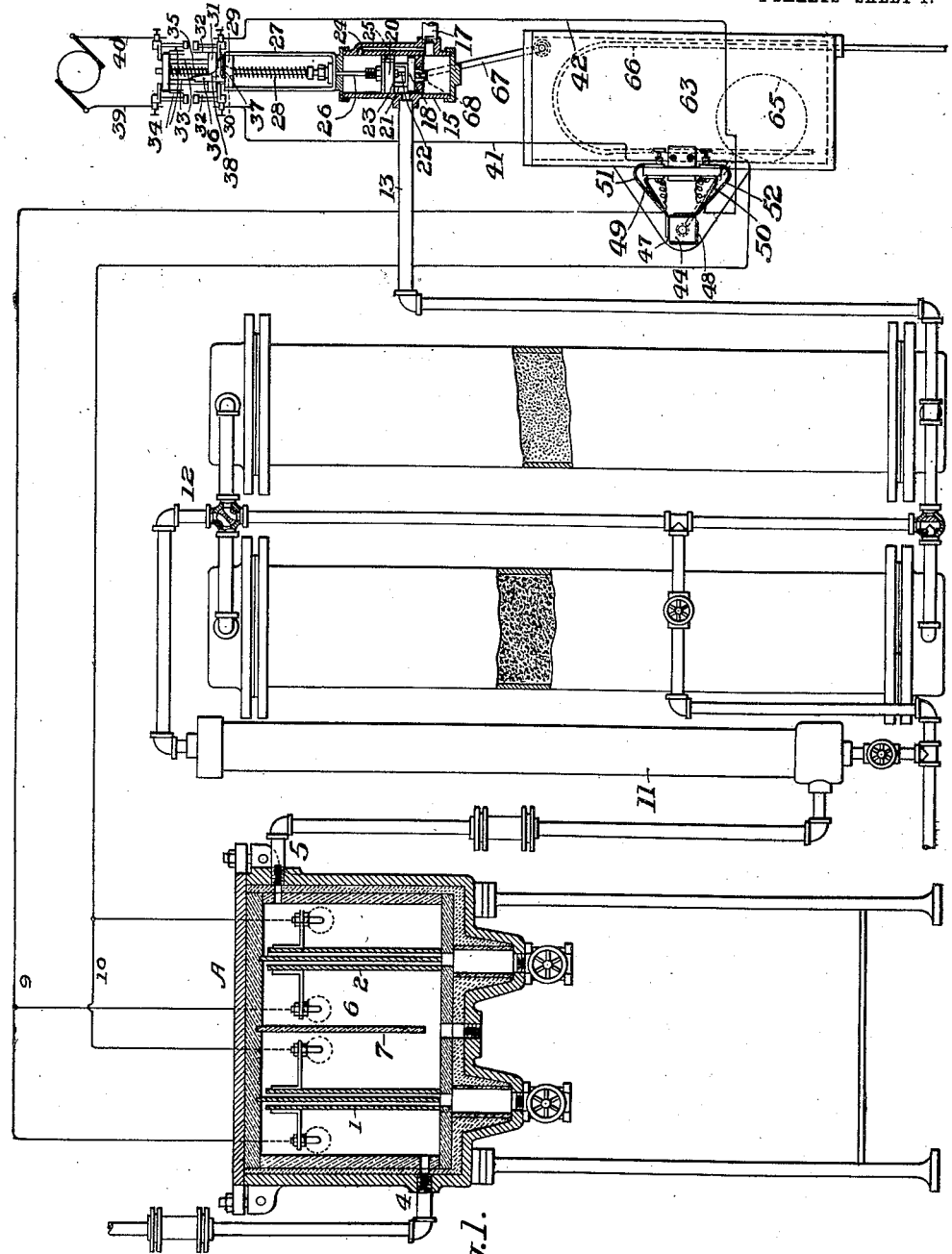

H. B. HARTMAN.
CURRENT REVERSING AND CONTROL MECHANISM FOR LIQUID PURIFYING APPARATUS.
APPLICATION FILED MAY 22, 1909.

951,315. Patented Mar. 8, 1910.

2 SHEETS—SHEET 1.

WITNESSES

INVENTOR
Harry B. Hartman,
By Fredk. W. Winter,
Attorney.

H. B. HARTMAN.
CURRENT REVERSING AND CONTROL MECHANISM FOR LIQUID PURIFYING APPARATUS.
APPLICATION FILED MAY 22, 1909.
951,315.
Patented Mar. 8, 1910.
2 SHEETS—SHEET 2.
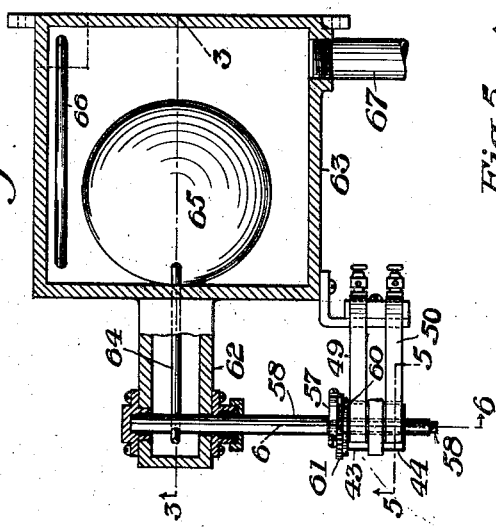
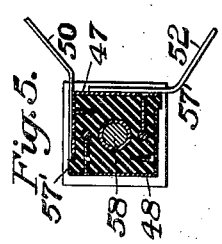
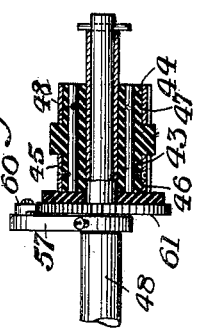
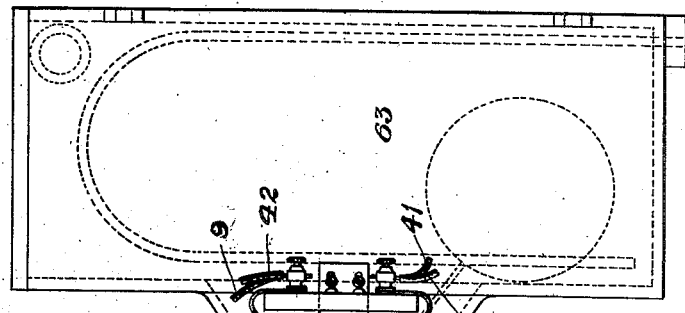
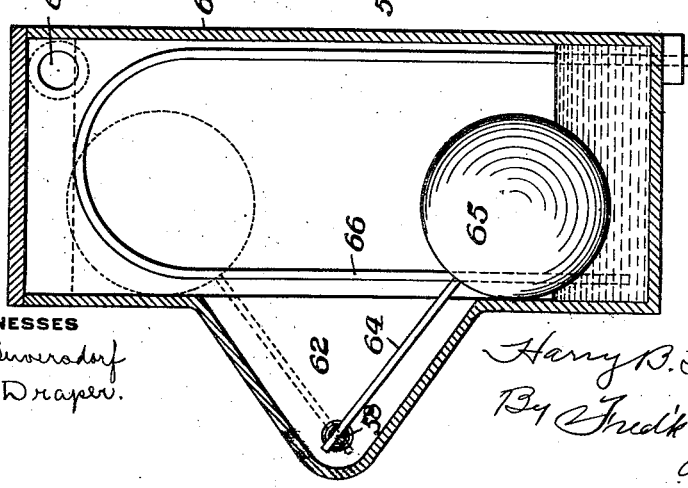
WITNESSES
F. L. Buversdorf
M. K. Draper.
INVENTOR
Harry B. Hartman
By Fred'k N. Winter
Attorney.

UNITED STATES PATENT OFFICE.

HARRY B. HARTMAN, OF PITTSBURG, PENNSYLVANIA, ASSIGNOR TO McDOWELL MANUFACTURING COMPANY, OF PITTSBURG, PENNSYLVANIA, A CORPORATION OF PENNSYLVANIA.

CURRENT REVERSING AND CONTROL MECHANISM FOR LIQUID-PURIFYING APPARATUS.

951,315.  Specification of Letters Patent.  Patented Mar. 8, 1910.

Application filed May 22, 1909. Serial No. 497,783.

*To all whom it may concern:*

Be it known that I, HARRY B. HARTMAN, a resident of Pittsburg, in the county of Allegheny and State of Pennsylvania, have invented a new and useful Improvement in Current Reversing and Control Mechanism for Liquid-Purifying Apparatus, of which the following is a specification.

This invention relates to apparatus for purifying water and other liquids electrolytically in which the liquid is subjected to the action of an electric current flowing between metallic plates, preferably of aluminum, or an aluminum composition or alloy, and more particularly to apparatus in which a direct current is periodically reversed.

The object of the invention is to provide apparatus for the purpose stated in which the circuit is made and broken with the starting and stoppage of flow of liquid through the apparatus, and also periodically reversed.

The invention relates to the mechanism for reversing the current, and to the same in combination with a circuit maker and breaker controlled by the flow of liquid through the apparatus and arranged to retard the breaking of the circuit for a considerable period of time after the liquid ceases to flow.

The invention comprises the combination and arrangement of parts hereinafter described and claimed.

In the accompanying drawings Figure 1 is a sectional diagrammatic view of the apparatus; Fig. 2 is a plan view of the reversing mechanism; Fig. 3 is a vertical sectional view through the same on the line 3—3, Fig. 2; Fig. 4 is a side view of the same; and Figs. 5 and 6 are detail sectional views taken respectively on the lines 5—5 and 6—6, Fig. 2.

In the drawings 1 illustrates a sealed electrode box in which the liquid is subjected to the action of the electric current. This box may be of any suitable construction, that shown being provided with a plurality of sets of electrodes 1 and 2, each set consisting of three plates so arranged that the liquid flows in a zigzag course up and down between the same. The inlet to the electrode box is at 4 near the top thereof and the outlet at 5 on the opposite side or end and also at the top, so that the box is always full of water and the plates entirely covered. Between the two sets of electrodes is a space 6 of very materially greater cross sectional area than the space between the electrodes and through which the water passes at a very much reduced rate of flow in order to give the gases and salts generated between the plates opportunity to act upon the impurities in the water. In this space a plate 7 projects downwardly from the top of the box toward the bottom and compels the water to flow down underneath the same before it can reach the second set of plates.

The particular box illustrated is claimed in my application filed concurrently herewith, Serial No. 497,732. It has been selected for purposes of illustration merely, as the present invention is not limited to the use of this specific box, but is equally applicable to any form of sealed box having therein metallic electrodes, preferably aluminum or an alloy containing aluminum, through which the liquid to be purified flows, and between which it is subjected to the action of the electric current. Aluminum or aluminum alloy plates are preferred as under the action of the electric current they give off oxy-hydrate of aluminum which is insoluble in the water and forms a flocculent precipitate with the impurities. The electrical connections to the electrodes are shown at 9 and 10.

Connected to the outlet of the electrode box is a vertical chamber 11 serving as a further mixing or coagulation and reaction chamber, and connected to the outlet of this chamber is a suitable mechanical filtering apparatus indicated generally at 12.

13 indicates the outlet pipe from the filtering apparatus, or the house service pipe.

In order to economize in current the circuit through the electrode box is made and broken with the starting and stopping of the flow of liquid through the apparatus, and preferably this is effected in a manner to maintain the current flow somewhat longer than the liquid flow, as described in my application filed concurrently herewith Serial No. 497,731. The device for producing this effect is similar to that shown and described in my application Serial No. 497,731 aforesaid, and is as follows: In the service pipe 13 is a suitable casing 15 having an inlet for the pipe 13 and an outlet 17 with a valve 18 normally held to close communication between the inlet and outlet. In the upper part of the casing in a piston 20 provided with a yoke 21 having a sliding fit on the stem 22 of the valve. Said stem at its upper end is provided with a nut or head 23 which limits the amount of idle or lost-motion movement which the piston may have upwardly without lifting the valve 18 from its seat. The chamber above the piston is connected by relief passage 24 with the outlet side of the casing and the piston is also provided with a small equalizing port 25. Connected to the piston is a rod 26 projecting up through a stuffing box in the upper end of the casing and through the upper end of a bracket 27 secured to the casing. This rod and the piston are normally held depressed by a helical compression spring 28 surrounding the rod between the bracket 27 and a collar 29 adjustably secured to said rod. Secured to the rod 26 above the bracket is a cone or cam shaped body 30 which in the upward movement of the rod engages and carries with it the cross head 31 carrying movable contacts 32 and which cross head is slidably mounted on suitable guides 33. The fixed contacts are shown at 34. The helical spring 35 is put under compression when the cross head moves upwardly. When elevated the cross head is locked in position to hold the circuit closed by means of trigger 36 which is held by a spring 37 in engagement with the cross head 31 and which is provided with a cam-shaped projection 38 in position to be contacted by the cone-shaped body 30 as the latter approaches the limit of its downward movement. One set of contacts has connected thereto the mains 39 and 40 of a suitable source of current, such as a direct current circuit, while the other set of contacts has connected thereto conductors 41 and 42 leading to the current reverser. The circuit maker and breaker shown is similar to that shown, described and claimed in my application filed concurrently herewith Serial No. 497,730.

The operation of the circuit maker and breaker is as follows: When the service pipe is closed and no water is flowing through the apparatus the valve 18 is seated, the piston 20 is in its lowermost position and the circuit is open. As soon as the service pipe is opened the pressure above the piston 20 is instantly relieved through passage 24, and consequently the piston is forced upwardly. This carries the cross head 31 upwardly and closes the circuit between terminals 32 and 34. These terminals contact before the lost-motion between yoke 21 and valve head 23 is entirely taken up. One set of these contacts is slidably mounted so as to permit further upward movement of the cross head after the contacts touch. The further upward movement of piston 20 brings the yoke 21 into contact with the head 23 of the valve stem and lifts said valve, thus permitting water to flow through the casing. The circuit, however, is closed before the valve 18 is opened. The trigger 36 engages and holds the cross head 31 when the latter reaches its uppermost position and thus locks the circuit closer with the circuit closed. As soon as the service pipe is closed the pressure backs up through relief passage 24 above the piston 20 and brings said piston down quite rapidly until the valve 18 is seated. The closing of valve 18 cuts off communication between the supply side of the casing and the passage 24, so that no further equalization can take place through the relief passage 24, and the subsequent equalization to permit the piston to come fully down must take place through the small leak port 25. This, however, is so small that the piston descends but slowly under the action of spring 28. Meanwhile the cross head 31 is locked in elevated position by trigger 26 and remains locked for a considerable period of time after the valve 18 is seated, or until the piston 20 approaches the limit of its downward movement, when the cone 30 contacts with the projection 38 of the trigger and releases the same from the cross head. This permits spring 35 to snap the cross head downwardly and break the circuit.

The circuit controller described operates entirely automatically to make and break the circuit by merely turning the water or other liquid being purified on and off, but in a manner to establish the current to the electrode box before any liquid begins to flow through the apparatus and to retard the breaking of the circuit for some time after the liquid ceases to flow.

In the circuit connections 41 and 42 is provided the reversing switch for periodically reversing the current to the electrodes. This is shown as of the rotary type comprising a rotary body provided with two substantially square portions 43 and 44. The body is formed of suitable insulating material, such as fiber. Covering two faces of the square portion 43 is a metallic contact plate 45, and on the opposite two faces is another metallic plate 46. Covering two faces of the square portion 44 is a metallic contact plate 47 and on the other two faces thereof is a contact plate 48. The plates 45 and 47 are cross connected through the insulating body, and the plates 46 and 48 are similarly cross connected, in a well understood manner. Plate 45 is displaced relatively to plate 47, and plate 46 is displaced relatively to plate 48 through 180 degrees. Bearing against the contact plates on the square portion 43 and on opposite faces thereof are a pair of spring brushes 49 and 51, one thereof connected to circuit wire 41 coming from the circuit maker and breaker, and the other connected to conductor 9 leading to the electrode plates. Similarly, bearing against the contact plates on the square portion 44 and on opposite faces thereof are a corresponding pair of spring brushes 50 and 52, one thereof connected to circuit wire 42 coming from the circuit maker and breaker, and the other connected to the conductor 10 leading to the electrode plates. The spring brushes 49, 50, 51 and 52 are made of rather stiff material and the square portions of the rotating body are provided at diagonally opposite corners with projections 57', so that after partial rotation of the body the springs cause the rotation to be completed with a snap to quickly change the circuit. The rotation of this body 43, 44 in step wise fashion will reverse the current, in a well understood manner.

The body 43, 44 is rotated step by step by the following mechanism: Said body is loosely mounted on shaft 58 which carries an arm 57 provided with a spring pressed pawl 60 which engages a ratchet wheel 61 secured to the body 43, 44. The shaft 58 is rocked back and forth so as to alternately move the pawl 60 and ratchet wheel 61 forwardly and to withdraw said pawl from said ratchet wheel to engage a new set of teeth. Said rock shaft is suitably mounted in a projection 62 extending from a tank or casing 63. Secured to said rock shaft inside of the casing projection 62 is a lever 64 carrying a float 65 located in the tank or casing 63. Also located in said tank is a siphon pipe 66 having one end open and located in proximity to the bottom of said tank, said pipe extending upwardly and then curving downwardly and having its opposite end extending through the bottom of the tank to a suitable waste outlet, such as a sewer. A pipe 67 connects the tank 63 with the inlet chamber in the casing 15 at 68 in such position that when valve 18 is closed said pipe 67 is also cut off, but when the valve 18 is lifted this connection is open. It is obvious that when the valve 18 is lifted the liquid flows through outlet 68 and pipe 67 into tank 63 thus gradually filling said tank and lifting the float 65. This rocks shaft 58 and through the pawl and ratchet mechanism described rotates the body 43, 44, so as to change the relations of the contact plates 45, 46, 47 and 48 with reference to the brushes 49, 50, 51 and 52 and reverses the circuit, as will be readily understood. The movement of the float is sufficient to rotate the shaft 58 through approximately 90 degrees and thus give a quarter turn to the circuit reversing switch. The liquid continues to flow into tank 63 until it reaches the height of the upper turn of the siphon pipe 66 when said tank automatically empties itself, thus permitting the float 65 to drop and rotate the shaft 58 backwardly and carry the pawl 60 backwardly over ratchet wheel 61 into engagement with a new tooth, so that upon the rising of the float the shaft and circuit changing switch are again rotated substantially a quarter turn. The pipe 67, or the connection thereof to casing 15 is of small size so that the tank 63 is filled only slowly, it being designed to actuate the circuit closing switch approximately at intervals of 30 minutes while liquid is flowing through the apparatus. The siphon pipe 66 is of sufficient size to quickly empty the tank 63. When no liquid is flowing through the apparatus the connection of pipe 67 is closed and hence the circuit reversing mechanism is not operative as long as no liquid is flowing through the apparatus. The tank 63 with float therein and the means for automatically filling and emptying said tank practically constitute a hydraulic motor operative during the flow of the liquid through the apparatus for operating the circuit reversing mechanism.

The apparatus described provides for automatically reversing the current through the electrodes from time to time and at substantially equal intervals of time while liquid is flowing, so that the deposits formed on the plates when the current is flowing in one direction are sloughed off when the current is reversed and the plates remain clean and develop their maximum efficiency. This reversing mechanism requires no source of power other than the flow of liquid being purified and provides a liquid operated motor which in no manner affects the flow or pressure of liquid through the purifying apparatus. Said motor is controlled by the valve mechanism which operates the circuit maker and breaker, and this reduces to a minimum the number of parts and provides a simple and efficient apparatus.

What I claim is:

1. Circuit reversing mechanism for liquid purifying apparatus comprising a reversing switch, and a motor actuated by the flow of the liquid being purified for actuating the reversing switch periodically during the flow of liquid.

2. Current reversing mechanism for liquid purifying apparatus comprising a reversing switch, and an automatically operating liquid actuated motor actuated by the flow of the liquid being purified for actuating said switch periodically during the flow of liquid.

3. Current reversing mechanism for liquid purifying apparatus comprising a reversing switch, a tank, a float therein connected to the switch and arranged as it rises and falls to actuate said switch, and means for automatically and periodically filling and emptying said tank.

4. Current reversing mechanism for liquid purifying apparatus comprising a reversing switch, a tank, a float therein connected to the switch and arranged as it rises and falls to actuate said switch, a supply to said tank, and a siphon arranged to automatically and periodically empty said tank.

5. Current reversing mechanism for liquid purifying apparatus comprising a reversing switch, a tank, a float therein connected to the switch and arranged as it rises and falls to actuate said switch, supply connections to said tank open when the liquid is flowing through the apparatus and closed when the liquid ceases to flow, and means for automatically and periodically emptying the tank.

6. Circuit reversing mechanism for liquid purifying apparatus, comprising a reversing switch, a tank, a float therein connected to the switch and arranged as it rises and falls to actuate said switch, supply connections to the tank arranged to supply liquid to the tank only when the liquid is flowing through the apparatus, and a siphon arranged to automatically and periodically empty said tank.

7. Current reversing mechanism for liquid purifying apparatus, comprising a rotary circuit changer, a rocking member, a ratchet and pawl connection between said member and circuit changer, a tank, a float therein connected to said rocking member, supply connections to said tank, and a siphon arranged to automatically and periodically empty said tank.

8. Circuit reversing mechanism for liquid purifying apparatus comprising a rotary circuit changer, a rocking member, ratchet and pawl connections between said rocking member and said circuit changer, a tank, a float therein connected to said rocking member, supply connections to said tank arranged to be opened when liquid is flowing through the apparatus and to be closed when no liquid is flowing, and means for automatically and periodically emptying said tank.

9. Liquid purifying apparatus comprising an electrode box, electrical connections thereto, a current reverser in said connections, a liquid actuated motor for actuating said current reverser, and a valve in the connections to said electrode box and arranged when the service pipe is open to allow liquid to flow to said motor and when closed to stop the flow of said liquid.

10. Liquid purifying apparatus comprising an electrode box, electrical connections thereto, a reversing switch in said connections, a liquid actuated motor for actuating said switch, a valve in the connections to the electrode box and arranged when the liquid is flowing through the apparatus to allow liquid to flow to the motor, and a circuit maker and breaker actuated by said valve.

11. Liquid purifying apparatus comprising an electrode box, electrical connections thereto, a reversing switch, a liquid actuated motor for actuating said switch, a valve in the connections to said box and arranged when liquid is flowing through the apparatus to allow liquid to flow to the motor, and a circuit maker and breaker actuated from said valve and arranged to retard the breaking of the circuit after the liquid ceases to flow.

12. Liquid purifying apparatus comprising an electrode box, electrical connections thereto, a reversing switch arranged to periodically reverse the current during the flow of liquid, a circuit maker and breaker, and valve mechanism in the connections to the box and actuated by liquid flow and arranged to both actuate the circuit maker and breaker and to control the reversing switch.

13. Liquid purifying apparatus comprising an electrode box, electrical connections thereto, a reversing switch, a liquid actuated motor for operating said switch, a circuit maker and breaker, and valve mechanism actuated by the liquid flow and arranged to both actuate the circuit maker and breaker and control said motor.

14. Liquid purifying apparatus, comprising an electrode box, electrical connections thereto, a current reverser, a tank, a float in said tank arranged when it rises and falls to actuate said reversing switch, a supply connection to said tank, means for automatically and periodically emptying said tank, a circuit maker and breaker, and valve mechanism arranged to both actuate the circuit maker and breaker and to control the flow of liquid to said tank.

In testimony whereof, I have hereunto set my hand.

HARRY B. HARTMAN.

Witnesses:
HOWARD NEELY,
F. W. WINTER.